United States Patent
Easley

(10) Patent No.: US 8,920,063 B1
(45) Date of Patent: Dec. 30, 2014

(54) BLIND FASTENER FOR SECURING A WORKPIECE

(71) Applicant: Gregory Daniel Easley, Sedgwick, KS (US)

(72) Inventor: Gregory Daniel Easley, Sedgwick, KS (US)

(73) Assignee: Mitee-Bite Products, LLC, Center Ossipee, NH (US)

(*) Notice: Subject to any disclaimer, the term of this patent is extended or adjusted under 35 U.S.C. 154(b) by 71 days.

(21) Appl. No.: 13/664,081

(22) Filed: Oct. 30, 2012

Related U.S. Application Data

(60) Provisional application No. 61/553,569, filed on Oct. 31, 2011.

(51) Int. Cl.
*F16B 5/00* (2006.01)

(52) U.S. Cl.
USPC .......................... 403/328; 411/348; 269/48.1

(58) Field of Classification Search
USPC .................. 403/322.2, 327, 328, 343, 408.1, 403/DIG. 6; 411/348; 269/43, 45, 254 CS
See application file for complete search history.

(56) References Cited

U.S. PATENT DOCUMENTS

| | | | | |
|---|---|---|---|---|
| 1,923,025 | A * | 8/1933 | Morse et al. ................... 70/34 |
| 3,390,712 | A * | 7/1968 | McKay ........................ 411/265 |
| 3,578,799 | A * | 5/1971 | Davis ............................ 269/51 |
| 4,932,642 | A * | 6/1990 | Salenbien et al. ........... 269/133 |
| 6,095,736 | A * | 8/2000 | Miller et al. .................. 411/352 |
| 6,109,602 | A | 8/2000 | Schron, Jr. et al. |
| 6,296,431 | B1 | 10/2001 | Miller |
| 7,731,465 | B2 | 6/2010 | Stapulionis et al. |
| 7,748,939 | B2 * | 7/2010 | Bulow et al. .................. 411/349 |
| 7,891,903 | B2 | 2/2011 | Klingenberg et al. |
| 7,914,225 | B2 | 3/2011 | Hageman |
| 7,967,538 | B1 * | 6/2011 | Coope et al. .................. 411/348 |
| 8,549,724 | B2 * | 10/2013 | Davies ....................... 29/525.01 |
| 2014/0079475 | A1 * | 3/2014 | O'Neill ........................ 403/299 |

OTHER PUBLICATIONS

Canadianmanufacturing.com; CMW Staff, "IMTS 2012 Preview: Mitee-Bite Prodcuts LLC introdcute two new working products", Aug. 17, 2012, Business Information Group, downloaded at http://www.canadianmanufacturing.com/metalworking/machining/imts-2012-preview-mitee-bite-products-llc-introduce-two new-workholdng-products-74576.*

* cited by examiner

*Primary Examiner* — Joshua Kennedy

(57) ABSTRACT

A blind fastener for securing a workpiece to a machining fixture includes an externally threaded housing, a pusher member and translating elements. The pusher member translates relative to the housing from an extended position to a retracted position. As the pusher member retracts, it urges the translating elements from an inboard position to an outboard position. The fixture has a closed ended tool hole that is threaded to receive the blind fastener. The workpiece has a corresponding tool hole with a radial groove. The workpiece tool hole receives the upper end of the blind fastener and the radial groove receives the translating elements when they extend. When the blind fastener is threaded into the fixture tool hole, the pusher member retracts and causes the translating elements to extend. The translating elements engage the radial groove of the workpiece tool hole and clamp the workpiece to the fixture.

19 Claims, 4 Drawing Sheets

BLIND FASTENER FOR SECURING A WORKPIECE

CROSS REFERENCES TO RELATED APPLICATIONS

This application claims the benefit of U.S. Provisional Patent Application Ser. No. 61/553,569 filed on Oct. 31, 2011, which is incorporated herein by reference.

FIELD OF THE INVENTION

The present invention relates to a blind fastener for securing a workpiece to a fixture mounted to a milling machine.

BACKGROUND

A stock metal workpiece is typically fastened to a fixture, which is, in turn, mounted to the bed of a milling machine. A workpiece usually includes excess material which presents bolt holes that receive bolts for mounting the workpiece to a machining fixture. A machining fixture usually consists of a flat plate with a pattern of threaded bolt holes for receiving such workpiece mounting bolts. Typical prior art workpiece mounting bolts generally have standard hexagonal heads that usually project above the surface of a workpiece. Such protruding bolt heads present obstacles in the machining process. What is needed is a fastener for securing a workpiece to a machining fixture that has no protruding head.

SUMMARY

The aforementioned needs are addressed by a blind fastener for securing a workpiece to a machining fixture. The machining fixture has a pattern of preferably identical threaded tool holes which either have closed bottoms or, if open, are placed on a surface. The workpiece has corresponding preferably identical tool holes, each of which have a radially extending groove which has a lower surface that is oriented normally with respect to the axis of the workpiece tool hole. The blind fastener includes a housing, a pusher member and translating elements. The housing is externally threaded to register with one of the fixture tool holes. The housing slidably receives the pusher member which moves relative to the housing between an extended position and a retracted position. A tool receiving feature at the upper end of the housing receives a tool for rotating the blind fastener. The housing has channels that receive the translating elements which are able to move between an inboard position and an outboard position. The upper end of the pusher member is shaped to urge the translating elements from the inboard position to the outboard position when the pusher member moves relative to the housing from the extended position toward the refracted position.

The blind fastener, the fixture tool hole and the workpiece tool hole are arranged such that when the blind fastener is received by the workpiece tool hole and threaded into the fixture tool hole, the following sequence of actions occur: (1) The lower end of the pusher member contacts the surface that closes the lower end of the fixture tool hole. (2) As the housing continues to be threaded into the fixture, the pusher member moves from the extended position toward the retracted position. (3) When the pusher member moves from the extended position toward the retracted position, the upper end of the pusher member urges the translating elements from the inboard position to the outboard position. (4) If the radially extending groove of the workpiece tool hole has been properly located, the translating elements will project into the radially extending groove when they translate to the outboard position, and, if the blind fastener is further threaded into the fixture; then, (a) if the pusher member has not reached the end of its travel, the translating elements will make contact with the lower surface of the radially extending groove; and, (b) if additional torque is applied to the blind fastener, the translating elements will apply force to the lower surface of the radially extending groove thereby clamping the workpiece to the fixture. As will be easily understood by those skilled in the art, reversing the above steps for all of the blind fasteners used to secure a workpiece to the fixture will allow an operator to unclamp and remove the workpiece from the fixture.

DETAILED DESCRIPTION

Figures 2, 3:
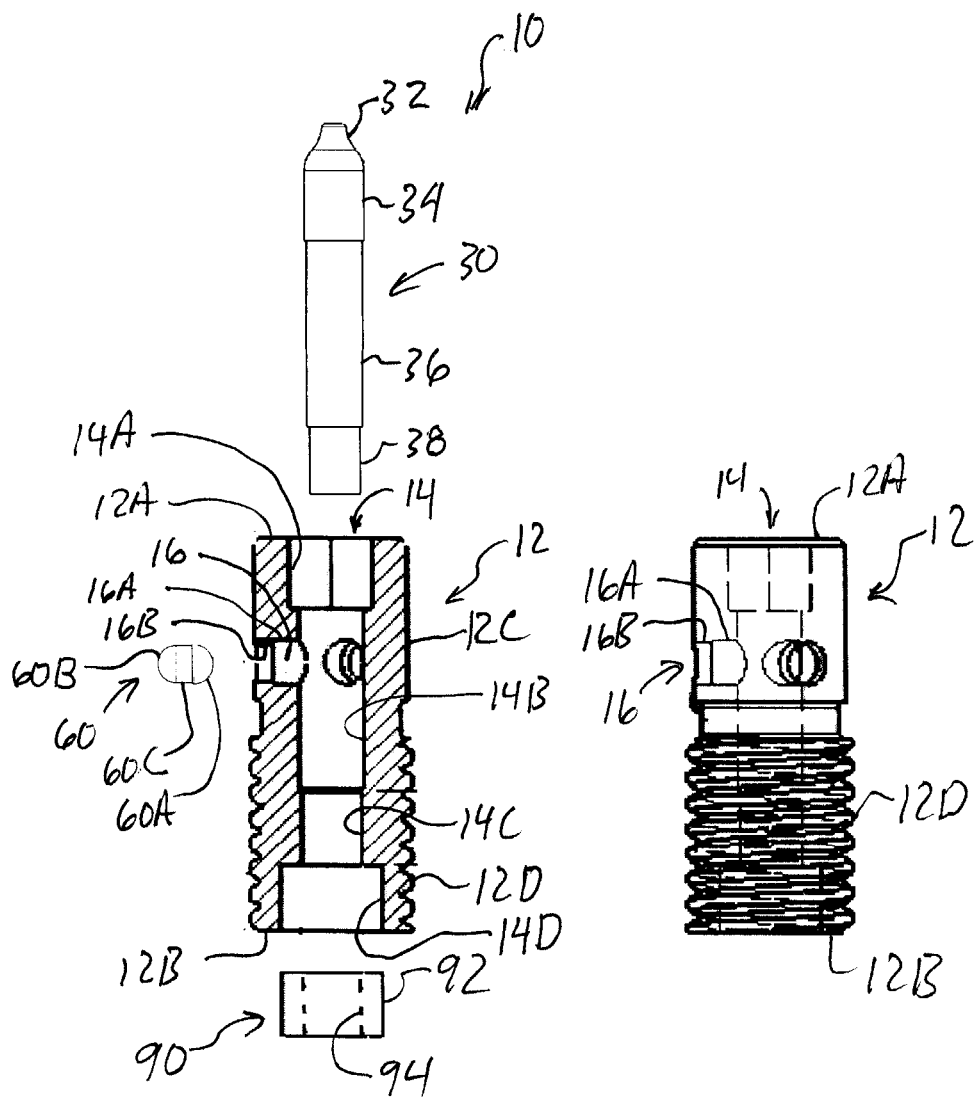
FIG. 2 is an exploded side view of the blind fastener with the housing shown in cross-section.
FIG. 3 is a side view of the housing of the blind fastener with hidden lines showing internal passages inside the housing.

Referring to the drawings, FIG. 2 shows an example embodiment of a blind fastener 10 partially installed for securing a workpiece 8 to a machining fixture 6. As can be seen in FIG. 2, fixture 6 includes an upper surface 6A, a generally parallel lower surface 6B. Fixture 6, when in use, may, for example, be mounted on the bed of a milling machine which is not shown in the figures. A threaded fixture tool hole 7 extends normally from upper surface 6A of fixture 6. In this example, tool hole 7 does not communicate with lower surface 6B of fixture 6, but has a closed bottom 7A. Optionally, if tool hole 7 extends though fixture 6, fixture 6 may be mounted on a generally flat machine bed that supplies a closed bottom for tool hole 7. As can be further seen in FIGS. 4A-5B, in this example, workpiece 8 has an upper surface 8A and a generally parallel lower surface 8B and a workpiece tool hole 9 extending between upper surface 8A and lower surface 8B. In practice, an operator may machine lower surface 8B as a first machined surface or as a datum surface and then bore tool hole 9 normal relative to the accurately milled lower surface 8B. Lower surface 8B is preferably flat at the location of tool hole 9 but may have other machined features which are not shown in these figures. By machining lower surface 8B first, it is possible at a later step to mill or machine upper surface 8A to a desired configuration once workpiece 8 is mounted to fixture 6 as will be described below. The wall of tool hole 9 presents a radial groove 9A that is spaced between upper surface 8A and lower surface 8B. A countersunk hole is not drilled from surface 8A, because tool hole 9 is drilled normal to lower surface 8B (the first machined surface or datum surface). Accordingly, using the same set-up, groove 9A is milled in the wall of tool hole 9.

In practice, the vendor of blind fastener 10 would preferably provide a custom cutter adapted for cutting groove 9A. Preferably, the custom cutter would have a cutting bit with a vertical dimension that matches the vertical dimension of groove 9A. Also, preferably, the vendor of blind fastener 10 would provide a suggested offset between workpiece lower surface 8B and groove 9A as well as a suggested depth for fixture tool hole 7.

Blind fastener 10 is configured to secure workpiece 8 to fixture 6 (which, in turn, is mounted to a milling machine which is not shown) and to do so preferably without presenting any portion of blind fastener 10 that is above the upper surface of workpiece 8. Thus, blind fastener 10 performs its function with a minimum of interference with machining operations. As can be best seen in FIG. 1, blind fastener 10 includes a housing 12, a pusher member 30, translating elements 60, a compression spring 80 and a retaining collar 90. As can be best understood with reference to FIG. 4A-5B, the lower end of bind fastener 10 is received by the threaded upper portion a fixture tool hole 7 while the upper end of fastener 10 is received by properly aligned tool hole 9 defined in workpiece 8. Spring 80 is preferably a standard helical compression spring. The other components of blind fastener 10 may be fashioned from high quality, hard, tough high-quality steel or a comparable material as would be selected by those skilled in the art desiring to select materials that are strong, hard and tough.

Figure 1:
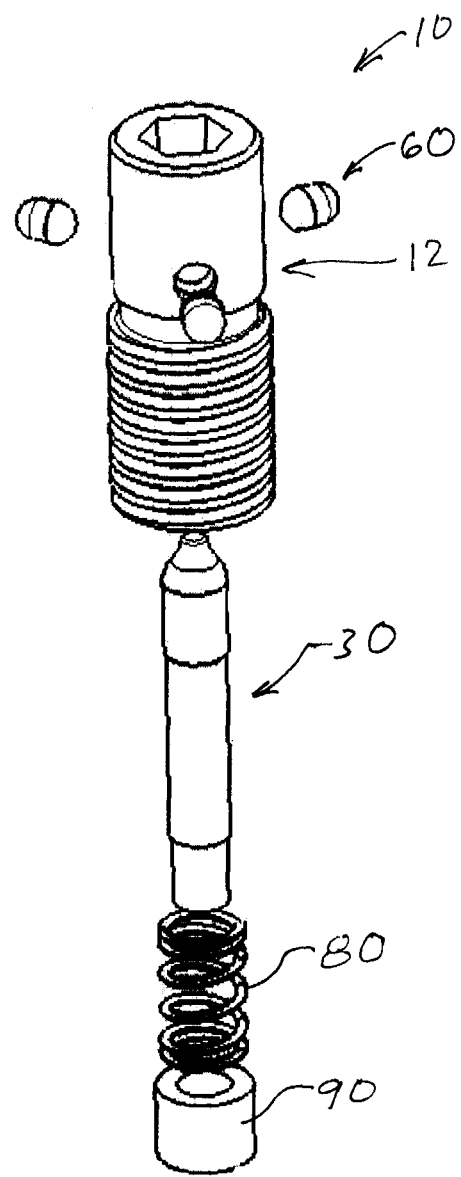
FIG. 1 is an exploded perspective view of an example blind fastener for securing a workpiece to a machining fixture.

The configuration of blind fastener 10 may be understood by referring to FIGS. 1-4B. FIG. 1 is an exploded view of blind fastener 10. As noted above, fastener 10 includes housing 12, pusher member 30, translating elements 60, compression spring 80 and retaining collar 90. As can be best seen in FIGS. 1, 2 and 3, housing 12 is generally cylindrical in shape and has an upper surface 12A, a lower surface 12B and an outside surface 12C. An axial bore 14 extends from upper surface 12A to lower surface 12B. At the upper end of bore 14 is a tool receiving feature 14A. In this example, tool receiving feature 14A is a hexagonal Allen key groove. Tool receiving feature 14A could be any tool receiving feature of the type suitable for engaging a tool for the purpose of rotating housing 12 while applying sufficient torque to housing 12 to accomplish operations which will be described in greater detail below. Extending down from Allen key groove 14A is a first cylindrical bore portion 14B that is preferably smaller in diameter than at least the corners of Allen key groove 14A. A second cylindrical bore portion 14C extends concentrically down from first bore portion 14B and has a diameter that is preferably smaller than the diameter of first bore portion 14B. A third cylindrical bore portion 14D communicates between second bore portion 14C and lower surface 12B and has a diameter that is preferably larger than second bore portion 14C. In this example, second channel portion 16B has a diameter that is smaller than first channel portion 16A. At least the lower portion of outside surface 12C of housing 12 presents threads 12D suitable for engaging the threaded portion of fixture tool hole 7 of fixture 6. The diameter of the non-threaded portion of outside surface 12C is preferably less than the inside diameter of tool hole 7 of fixture 6. As will be appreciated by those skilled in the art, housing 12 should be fashioned from hard, high-quality steel suitable for high-strength bolts and the like.

In this example, three evenly spaced radial channels 16 communicate between first bore portion 14B and outside surface 12C of housing 12. In this example, there are three channels 16, but any number of channels greater than two might be acceptable. Channels 16 are preferably evenly spaced in a radial pattern around outside surface 12C. Preferably, channels 16 are also generally equally spaced from upper surface 12A. In this example, channels 16 each have a first channel portion 16A extending from the inside surface of first bore portion 14B and a second channel portion 16B extending from first channel portion 16A to outside surface 12C. In this example, first channel portion 16A that communicates with bore 14 has a larger diameter than second channel portion 16B that communicates with the outside surface of housing 12.

Channels 16 receive and retain translating elements 60. Translating elements 60 may take the form of pins, cylindrical pins, cylindrical pins having hemispherical ends as shown in FIGS. 1-4B or ball bearings as shown in FIGS. 5A and 5B. As shown in FIGS. 1-5B, each translating element 60 includes a first hemispherical end portion 60A, a second opposite hemispherical 60B end portion and a cylindrical portion 60C extending between the first and second hemispherical end portions 60A and 60B. The diameter of first hemispherical end portion 60A is registered to be smaller than the diameter of first channel portion 16A of channel 16, but larger than the diameter of second channel portion 16B of channel 16. Further, the diameters of second hemispherical end portion 60B and cylindrical portion 60C are registered to be smaller than the diameter of second channel portion 16B. Accordingly, with some care, a translating element 60 may be installed into a channel 16 by maneuvering translating elements 60 into bore 14 and locating translating element 60 in channels 16 with second hemispherical end portion 60B directed outwardly into channel 16. Once all three translating elements 60 are thus installed, the placement of pusher member 30 in bore 14 with pusher member 30 in the extended position shown in FIG. 4A will trap translating elements 60 within channels 16.

FIGS. 5A and 5B illustrate an alternative configuration for the translating elements, namely spherical translating elements 160. In this example, translating elements 160 are simple steel balls as might be used in ball bearings. Accordingly, translating elements 160 are hard, tough and accurately spherical. The channels 116 for receiving spherical translating elements 160 are also altered so that they have a cylindrical portion for accommodating spherical translating elements 160 and an outboard lip 116A of a slightly smaller diameter. The diameter of lip 116A needs to be slightly less than the diameter of spherical elements 160 in order to retain spherical translating elements 160 within fastener housing 12. As can be seen in FIG. 5B, when pusher member 30 is in the retracted position, spherical translating elements 160 are pushed by the upper end of pusher member 30 to an outboard position. If lower surface 9A of groove 9 is located properly, translating elements 160 will push down on lower surface 9A, thereby clamping workpiece 8 to fixture 6 before pusher member 30 reaches the end of its travel. The skilled reader should understand that in the description below, references to translating elements 60 and channels 16 should be understood also as references to translating elements 160 and channels 116 shown in FIGS. 5A and 5B.

Third cylindrical bore portion 14D, which, as noted above, extends from lower surface 12B of housing 12 slidably receives retaining collar 90. Retaining collar 90 has an axial bore 94. The purpose of axial bore 94 will be described below.

Axial bore 14 of the fastener housing 12 slidably receives pusher member 30. As can be seen in FIGS. 1 and 2, pusher member 30 is generally cylindrical and has portions of varying diameters as well as a pusher head portion 32. In this example, pusher head portion 32 is preferably axially symmetrical and has a tapered cone like shape operable for radially pushing the first hemispherical surfaces 60A of translating elements 60 as will be described in greater detail below. Extending down from pusher head portion 32 is a first cylindrical portion 34 which has an outside diameter registered to slidably fit within the inside diameter of first cylindrical bore portion 14B of housing 12. Extending down from first cylindrical portion 34 is a second cylindrical portion 36, which is preferably concentric with first cylindrical portion 34 and has an outside diameter that is smaller than the diameter of first cylindrical portion 34. Second cylindrical portion 36 is registered to fit and slide within bore portion 14C of housing 12. Preferably, first cylindrical portion 34 is larger than second bore portion 14C of housing 12 so that pusher member 30 is prevented from sliding out from the bottom of housing 12. Extending down from second cylindrical portion 36 is a third cylindrical portion 38, which, in this example, has an outside diameter that is smaller than the diameter of second cylindrical portion 36 and which is registered to establish a force fit with axial bore 94 of retaining collar 90. Retaining collar 90 primarily provides a surface for receiving the lower end of spring 80. (Spring 80 is omitted from FIG. 2 for clarity but can be best seen in FIG. 1.)

Figure 4A:
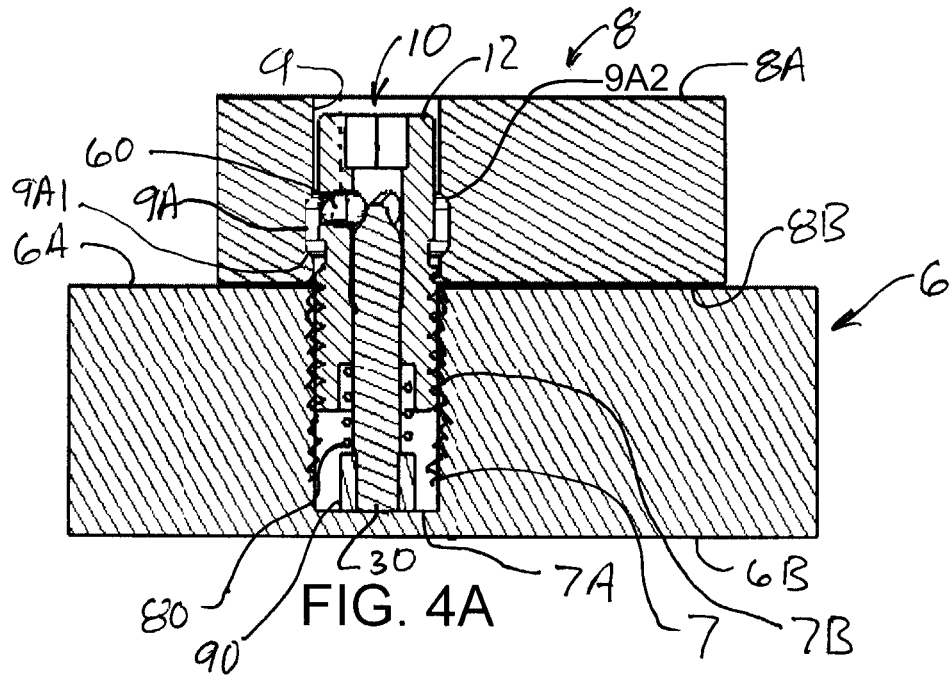
FIG. 4A is a cross-section side view showing the blind fastener partially installed between a machining fixture and a workpiece with the pusher member in the extended position and the translating elements in the refracted position.
Figure 4B:
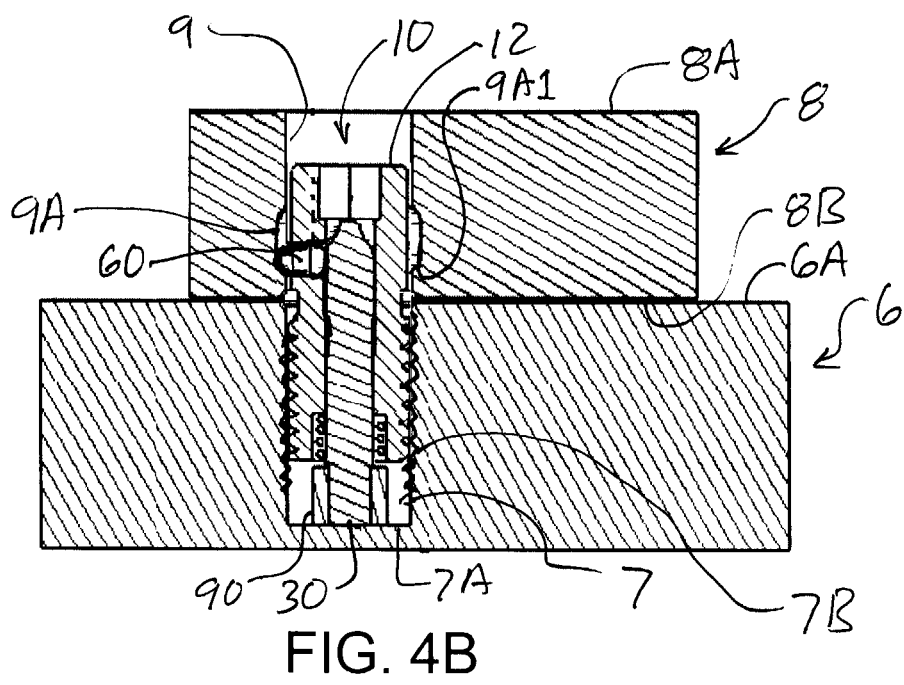
FIG. 4B is a cross-section side view showing the blind fastener completely installed for clamping a workpiece to a machining fixture with the pusher member in the retracted position and the translating elements in the extended position.
Figure 5A:
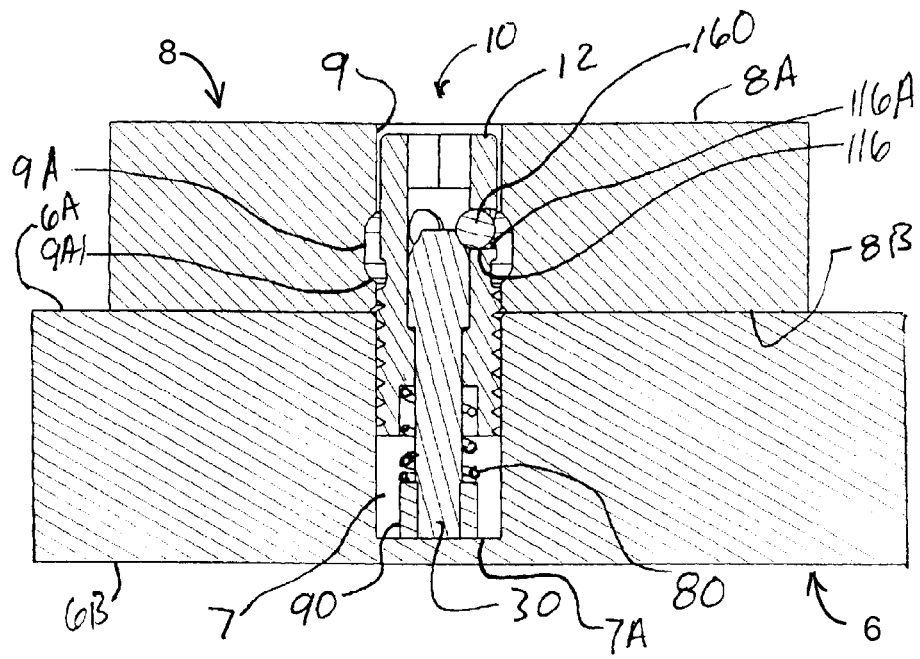
FIG. 5A is a cross-section side view showing the blind fastener partially installed between a machining fixture and a workpiece with the pusher member in the extended position and the translating elements in the refracted position wherein the blind fastener has sphere shaped translating elements.
Figure 5B:
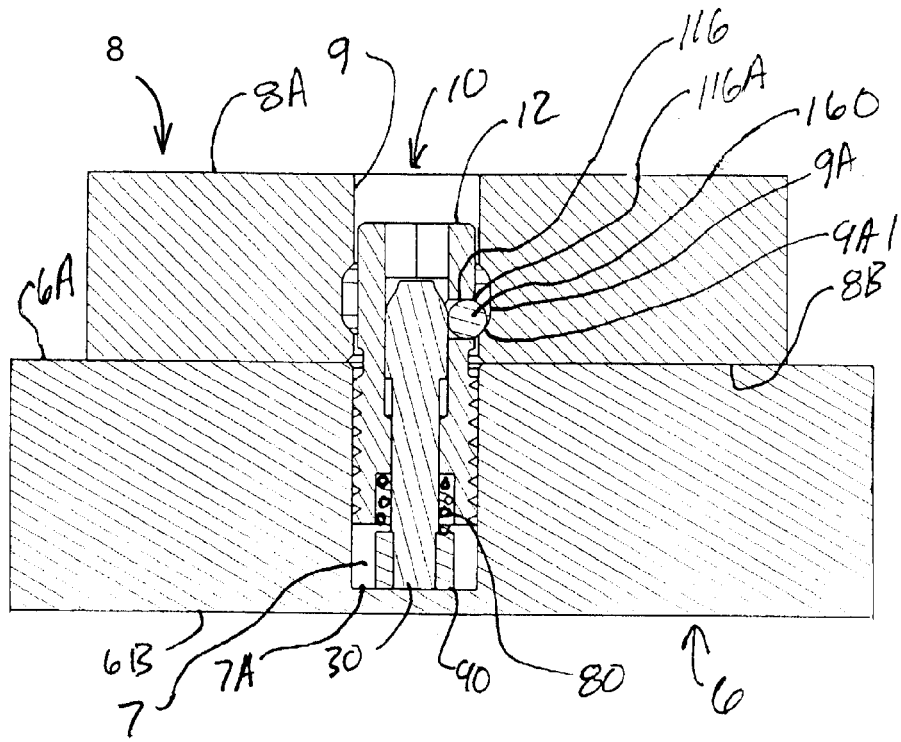
FIG. 5B is a cross-section side view showing the blind fastener completely installed for clamping a workpiece to a machining fixture with the pusher member in the retracted position and the translating elements in the extended position wherein the blind fastener has sphere shaped translating elements.

As is best understood by referring to FIGS. 4A and 4B as well as FIGS. 5A and 5B, pusher member 30 moves between a first extended position shown in FIGS. 4A and 5A and a second retracted position shown in FIGS. 4B and 5B. Translating elements 60 are nested in channels 16 of housing 12 as described above. Each translating element 60 is able to move between a first inboard position shown in FIG. 4A and a second outboard position shown in FIG. 4B. In this example, fastener 10 is assembled by following these steps: (1) Translating elements 60 are installed in channels 16 as described above. (2) With translating elements 60 in the outboard position, pusher member 30 is inserted through bore 14 of housing 12 from the upper end until first cylindrical surface 34 of pusher member 30 is at the lower end of first cylindrical bore portion 14B of housing 12. (3) Compression spring 80 is placed around the lower end of pusher member 30. (4) Pusher member 30 is force fitted into collar 90 by force fitting third cylindrical portion 38 of pusher member 30 into bore 94 of collar 90. After assembly, spring 80 biases pusher member 30 in the extended position. Pusher member 30 is retained in housing 12 because the outside diameter of first cylindrical surface 34 of pusher member 30 is larger than the inside diameter of second bore portion 14C of housing 12. Therefore, in this example, it is not possible for pusher member 30 to drop down out of housing 12.

The function of blind fastener 10 may be best understood by referring to FIGS. 4A and 4B as well as FIGS. 5A and 5B. For clarity only FIGS. 4A and 4B will be referred to here. The skilled reader should understand that the same procedure is applicable for the device shown in FIGS. 5A and 5B with the exception that spherical elements 160 replace translating elements 60 and channels 116 replace channels 16. In FIG. 4A, tooling hole 9 of workpiece 8 has been aligned with tool hole 7 of machining fixture 6. In practice, workpiece 8 will usually have a plurality of tooling holes 9 that register with corresponding tool holes 7 in machining fixture 6. Also, in practice, machine fixture 6 is typically secured to the bed of a machine (not shown) such as a milling machine (not shown). Also, typically, in practice, the milling machine will be computer controlled in order to exploit the advantages inherent in blind fastener 10. As can be seen in FIG. 4A, tooling hole 9 of workpiece 8 includes a radial groove 9A defined in its inside surface. As will be appreciated from the description given below, the geometry and location of groove 9A must be such that a lower surface 9A1 of groove 9A is spaced at a predetermined distance from bottom surface 7A of tool hole 7 of fixture 6 and such that groove 9A extends evenly in a circumferencial manner as indicated in FIGS. 4A-5B. As can be seen in FIGS. 4A-5B, groove 9A has a radiused lower surface 9A1 having a radius which preferably corresponds to the radii of the outboard portions of translating elements 60 (or the radii of translating elements 160 shown in FIGS. 5A and 5B). Since groove 9A is machined relative to lower surface 8B of work piece 8, the planes defined by the upper and lower edges of lower surface 9A1 are preferably parallel to lower surface 8B. Still further, the diameter of radial groove 9A must be sufficient so that the fully extended translating elements 60 do not interfere with the wall of groove 9A. The overall height of radial groove 9A need only be sufficient to accommodate extending translating elements 60 when they emerge from the outside wall of housing 12. As can also be seen by referring to FIGS. 4A-5B, the internal surface of bore 7 is threaded from its upper end and those threads are arranged to receive the externally threaded portion 12D of housing 12.

The skilled reader should appreciate the dimensions of the various features of fixture tool hole 7, workpiece tool hole 9 and the various parts of blind fastener 10 are critical to the function of blind fastener 10. The dimensions of the various features of pusher member 30, housing 12 and translating elements 60 as well as the location of groove 9A in the wall of workpiece tool hole 9 are arranged such that when housing 12 is further threaded into tool hole 7 from the position shown in FIG. 4A, pusher member 30 remains stationary because it is in contact with bottom surface 7A of tool hole 7. While pusher member 30 remains stationary, rotating housing 12 continues to thread into fixture 6 and translates down relative to pusher member 30. The downward translation of housing 12 relative to pusher member 30 causes pusher head portion 32 to contact translating elements 60 and thereby urge translating elements 60 toward the outboard position shown in FIG. 4B (and FIG. 5B). The skilled reader will recall that while translating elements 60 are being urged outwardly, housing 12 and translating elements 60 are descending in a spiral path as an operator continues to turn housing 12 upon its threads. As the rotation of externally threaded housing 12 continues, the outboard second spherical end surfaces 60B of translating elements 60 eventually come in contact with the lower edge 9A1 of radial groove 9A. When further torque is applied to housing 12, the extended translating elements 60 apply a downward clamping force on the lower surface 9A1 of groove 9A causing workpiece 8 to be clamped down on fixture 6. When this process is repeated in several locations, workpiece 8 is securely and accurately mounted to machining fixture 6.

If blind fastener 10 is to be used to clamp workpiece 8 to fixture 6, other conditions must be met. Namely, the distance between the lower end of pusher member 30 when it has reached the end of its travel and the centers of translating elements 60 must be less than the distance between the bottom surface 7A of fixture tool hole 7 and the upper edge of lower surface 9A1 of groove 9A. If this condition is met, as is shown in FIGS. 4B and 5B, translating elements 60 will make contact with lower surface 9A1 of groove 9A before pusher member 30 has reached the end of its travel. Because additional pusher member travel is available when fastener 10 is in the position shown in FIGS. 4B and 5B, it is possible to further rotate fastener 10 in order to clamp workpiece 8 to fixture 6. In order for translating elements 60 to not intefere with wall of tool hole 9 when pusher member 30 pushes them into the outboard position, it is necessary that the vertical dimension of groove 9A is large enough so that translating elements 60 emerge into groove 9A instead of intefering with the wall of tool hole 9. In order to prevent such an inteference, it is necessary that the spacing between bottom surface 7A of tool hole 7 and the lower edge of upper surface 9A2 of groove 9A must be greater than the distance between the lower end of pusher member 30 and the centers of translating elements 60 when pusher member 30 first makes contact with translating elements 60 (i.e., first begins pushing translating elements 60 toward the outboard position) as shown in FIGS. 4A and 5A. In actual practice, if the lower end of groove 9A is located properly to facilitate clamping as described above and if the cutting bit for cutting groove 9A has an appropriate vertical dimension, groove 9A will extend far enough to receive translating elements 60 when they first emerge from housing 12.

As can be understood from the above description, blind fastener 10 is effective for securing a workpiece while using as little additional material as possible. With the absence of a protruding bolt head it is possible to use a much smaller piece of sacrificial material in order to secure a workpiece. Because of this, more workpieces may be secured to a fixture. This would increase the rate of thru-put. Still further, unlike a standard bolt, blind fasteners 10 do not need to be completely removed to install the next set of workpieces. Blind fasteners 10 merely need to be loosened until each pusher member 30 is in the extended position shown in FIG. 4A. Once a pusher member 30 is in the extended position, pulling a workpiece 8, which is configured as shown in FIGS. 4A-5B, will cause translating elements 60 to retract thereby allowing the rapid removal and replacement of workpieces. Accordingly, parts may be machined with less material, in greater quantities and with faster turn-around time.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A blind fastener for securing a workpiece to a workpiece holding fixture, comprising:
    a housing, a pusher member and translating elements,
    the housing having an inside wall and an outside wall, the housing presenting external threads extending from a lower end thereof suitable for registering with a threaded hole of the workpiece holding fixture, the housing slidably receiving the pusher member for movement between an extended position and a retracted position, the housing having channels extending between the inside wall and the outside wall thereof, the translating elements nested in the channels, and being able to move between an inboard position and an outboard position, an upper end of the pusher member also being able to urge the translating elements from the inboard position toward the outboard position when the pusher member moves from the extended position toward the retracted position,
    whereby when the blind fastener is able to be inserted through a workpiece tool hole which has a radially extending groove spaced from the lower surface of the workpiece, and when the blind fastener is threaded into the threaded hole of the workpiece holding fixture having a closed bottom and which is aligned with the workpiece tool hole, the pusher member contacts the closed bottom of the threaded hole and remains stationary as the housing continues to thread into threaded hole and translates down relative to pusher member which causes the upper end of the pusher member to contact the translating elements and thereby urge the translating elements toward the outboard position and into the radially extending groove of the workpiece tool hole, and, as the blind fastener is further threaded into the threaded hole, the translating elements contact the lower surface of the workpiece tool hole radially extending groove such that the workpiece is clamped to the workpiece holding fixture as additional torque is applied to the blind fastener.

2. The blind fastener of claim 1, wherein;
the pusher member is biased toward the extended position.

3. The blind fastener of claim 1, wherein;
the translating elements have rounded ends.

4. The blind fastener of claim 1, wherein;
the translating elements have rounded ends and the upper end of the pusher member is tapered.

5. The blind fastener of claim 1, wherein;
the translating elements are sphere shaped.

6. The blind fastener of claim 1, wherein;
the translating elements are sphere shaped and the upper end of the pusher member is tapered.

7. A blind fastener for securing a workpiece to a workpiece holding fixture, comprising:
    (a) a fastener housing presenting external threads extending from a lower end thereof suitable for registering with the internal threads of a workpiece holding fixture tool hole, the fastener housing also having an axial bore and channels located which communicate between the axial bore and the outside surface of the fastener housing, the fastener housing also having a feature at its upper end for engaging a tool,
    (b) a pusher member slidably received by the axial bore of the fastener housing, the pusher member movable between a first extended position and a second retracted position,
    (c) translating elements received by the channels of the fastener housing, each translating element being able to move between an inboard position and an outboard position, the translating elements and the pusher member arranged such that when the pusher member translates relative to the fastener housing from the extended position to the retracted position, the pusher member urges the translating elements from the inboard position toward the outboard position,
    whereby when the blind fastener is inserted into a workpiece tool hole which presents a radially extending groove in the wall thereof, the radially extending groove presenting at least a lower surface and threaded into a threaded closed bottom workpiece holding fixture tool hole which is aligned with the workpiece tool hole, the pusher member contacts the closed bottom of the workpiece holding fixture tool and remains stationary as the housing continues to thread into the workpiece holding fixture tool hole and translates down relative to pusher member which causes the pusher member to contact the translating elements and thereby urge the translating elements toward the outboard position, the translating elements being received by the radially extending groove of the workpiece tool hole, and, as the blind fastener is further threaded into the workpiece holding fixture tool hole, the translating elements contact the lower surface of the radially extending groove of the workpiece tool hole and apply a downward clamping force on the workpiece thus clamping the workpiece to the holding fixture as torque is applied to the blind fastener.

8. The blind fastener of claim 7, wherein;
the pusher member is biased toward the extended position.
9. The blind fastener of claim 7, wherein;
the translating elements have rounded ends.
10. The blind fastener of claim 7, wherein;
the translating elements have rounded ends and the upper end of the pusher member is tapered.
11. The blind fastener of claim 7, wherein;
the translating elements are sphere shaped.
12. The blind fastener of claim 7, wherein;
the translating elements are sphere shaped and the upper end of the pusher member is tapered.
13. A blind fastener for securing a workpiece to a workpiece holding fixture, comprising:
 (a) a cylindrical fastener housing having an upper end and a lower end, an outside surface and an inside surface, the housing having external threads extending from the lower end thereof, the external threads being suitable for registering with corresponding internal threads presented by a threaded tool hole of a workpiece holding fixture,
 (b) the fastener housing further defining an axial bore extending to the lower end thereof, the upper end of the housing presenting a tool receiving feature suitable for receiving a tool for rotating the fastener housing and for applying torque to the fastener housing,
 (c) the fastener housing further presenting radial channels communicating between the axial bore of the fastener housing and the outside surface of the fastener housing,
 (d) a pusher member slidably received by the axial bore of the fastener housing, the pusher member operable for axial movement between a first extended position and a second retracted position,
 (e) translating elements nested in the channels of the fastener housing, each translating element being able to move between a first retracted position and a second extended position, the translating elements and the pusher member arranged such that when the pusher member translates from the extended position to the retracted position, the upper end of the pusher member contacts the translating elements and urges the translating elements from the retracted position to the extended position,
 (f) the fastener housing, the channels, the translating elements, and the pusher member arranged such that the blind fastener is able to be inserted into the aligned tool holes of a workpiece and a workpiece holding fixture wherein the workpiece tool hole presents a wider portion having a lower limit and wherein the workpiece holding fixture tool hole presents a closed bottom and internal threads and wherein the blind fastener is able to be threaded into the workpiece holding fixture tool hole until the pusher member contacts the closed bottom of the workpiece holding fixture tool hole and remains stationary as the housing continues to thread into the workpiece holding fixture tool hole and translates down relative to the pusher member which causes the upper end of the pusher member to contact the translating elements and thereby urge the translating elements to the extended position, the wider portion of the workpiece tool hole located such that the wider portion is able to receive the translating elements as the translating elements move to the extended position, the workpiece tool hole wider portion also located, such that, as the blind fastener is further threaded into the fixture tool hole the translating elements contact the lower limit of the workpiece tool hole wider portion such that the workpiece is clamped to the workpiece holding fixture as additional torque is applied to the blind fastener.

14. The blind fastener of claim 13, wherein;
the pusher member is biased toward extended position.
15. The blind fastener of claim 13, wherein;
the pusher member has a collar at its lower end and the pusher member is biased in the extended position by a compression spring positioned between the collar and the fastener housing.
16. The blind fastener of claim 13, wherein;
the translating elements have rounded ends.
17. The blind fastener of claim 13, wherein;
the translating elements have rounded ends and the upper end of the pusher member is tapered.
18. The blind fastener of claim 13, wherein;
the translating elements are sphere shaped.
19. The blind fastener of claim 13, wherein;
the translating elements are sphere shaped and the upper end of the pusher member is tapered.

\* \* \* \* \*